(12) United States Patent
Ikari et al.

(10) Patent No.: US 9,090,513 B2
(45) Date of Patent: Jul. 28, 2015

(54) METHOD OF MANUFACTURING TRANSPARENT SESQUIOXIDE SINTERED BODY, AND TRANSPARENT SESQUIOXIDE SINTERED BODY MANUFACTURED BY THE METHOD

(71) Applicant: Shin-Etsu Chemical Co., Ltd., Tokyo (JP)

(72) Inventors: Masanori Ikari, Annaka (JP); Yoshihiro Nojima, Annaka (JP); Shinji Makikawa, Annaka (JP); Akio Ikesue, Nagoya (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/044,162

(22) Filed: Oct. 2, 2013

(65) Prior Publication Data
US 2014/0094357 A1    Apr. 3, 2014

(30) Foreign Application Priority Data
Oct. 3, 2012 (JP) .................................. 2012-221081

(51) Int. Cl.
*C04B 35/447* (2006.01)
*C04B 35/50* (2006.01)
(Continued)

(52) U.S. Cl.
CPC ............... *C04B 35/50* (2013.01); *C04B 35/505* (2013.01); *C04B 35/62675* (2013.01);
(Continued)

(58) Field of Classification Search
CPC .... C04B 35/447; C04B 35/486; C04B 35/48; C04B 2235/3217; C04B 35/505; C23C 14/3414

USPC .......................................... 501/102, 103, 126
See application file for complete search history.

(56) References Cited

U.S. PATENT DOCUMENTS 3,545,987 A * 12/1970 Anderson ..................... 501/152
4,421,671 A * 12/1983 Cusano et al. .......... 252/301.4 F
(Continued)

FOREIGN PATENT DOCUMENTS

JP     5-330912 A    12/1993
JP     6-211573 A    8/1994
(Continued)

OTHER PUBLICATIONS

Yoshida. Low-Temperature Spark Plasma Sintering of Yttria Ceramics with Ultrafine Grain Size. J Am Ceram Soc, 94 (10) 3301-3307, 2011.*
(Continued)

*Primary Examiner* — Noah Wiese
(74) *Attorney, Agent, or Firm* — Birch, Stewart, Kolasch & Birch, LLP

(57) ABSTRACT

Provided is a method of manufacturing a transparent sesquioxide sintered body by which a transparent $M_2O_3$ type sesquioxide sintered body can be manufactured. A powder including particles of an oxide of at least one rare earth element selected from Y, Sc or lanthanide elements and Zr oxide particles is prepared as a raw material powder, wherein in the particle size distribution of the rare earth element oxide particles, or in the particle size distribution of secondary particles in the case where the rare earth element oxide particles are agglomerated to form the secondary particles, the particle diameter $D_{2.5}$ value at which the cumulative particle amount from the minimum particle size side is 2.5% based on the total particle amount is in the range from 180 nm to 2000 nm, inclusive. The raw material powder is press molded into a predetermined shape, followed by sintering.

6 Claims, 5 Drawing Sheets

(51) Int. Cl.

| | | |
|---|---|---|
| *C04B 35/505* | (2006.01) | |
| *C04B 35/626* | (2006.01) | |
| *C04B 35/638* | (2006.01) | |
| *C04B 35/645* | (2006.01) | |
| *C09K 11/77* | (2006.01) | |
| *H01J 5/04* | (2006.01) | |
| *H01J 9/24* | (2006.01) | |
| *H01J 61/30* | (2006.01) | |
| *H01S 3/16* | (2006.01) | |

(52) U.S. Cl.
 CPC .......... *C04B 35/638* (2013.01); *C04B 35/6455* (2013.01); *C09K 11/7769* (2013.01); *H01J 5/04* (2013.01); *H01J 9/247* (2013.01); *H01J 61/302* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/5436* (2013.01); *C04B 2235/5445* (2013.01); *C04B 2235/5463* (2013.01); *C04B 2235/5481* (2013.01); *C04B 2235/604* (2013.01); *C04B 2235/6562* (2013.01); *C04B 2235/6565* (2013.01); *C04B 2235/6567* (2013.01); *C04B 2235/661* (2013.01); *C04B 2235/72* (2013.01); *C04B 2235/762* (2013.01); *C04B 2235/77* (2013.01); *C04B 2235/9653* (2013.01); *H01S 3/1685* (2013.01)

(56) References Cited

U.S. PATENT DOCUMENTS

| | | | |
|---|---|---|---|
| 4,571,312 A | 2/1986 | Greskovich et al. | |
| 6,825,144 B2 | 11/2004 | Hideki et al. | |
| 7,597,866 B2* | 10/2009 | Hosokawa et al. | 423/263 |
| 7,751,123 B2* | 7/2010 | Zimmer et al. | 359/642 |
| 2009/0108507 A1* | 4/2009 | Messing et al. | 264/605 |
| 2010/0227754 A1 | 9/2010 | Bernard-Granger et al. | |
| 2014/0002900 A1 | 1/2014 | Makikawa et al. | |

FOREIGN PATENT DOCUMENTS

| | | |
|---|---|---|
| JP | 11-157933 A | 6/1999 |
| JP | 2007-334357 A | 12/2007 |
| JP | 4033451 B2 | 1/2008 |
| JP | 2008-143726 A | 6/2008 |
| JP | 2009-23872 A | 2/2009 |
| JP | 2011-121837 A | 6/2011 |
| JP | WO 2012/124754 A1 | 9/2012 |

OTHER PUBLICATIONS

Extended European Search Report, dated Nov. 21, 2013, for European Application No. 13187246.7.

* cited by examiner

METHOD OF MANUFACTURING TRANSPARENT SESQUIOXIDE SINTERED BODY, AND TRANSPARENT SESQUIOXIDE SINTERED BODY MANUFACTURED BY THE METHOD

CROSS-REFERENCE TO RELATED APPLICATION

This non-provisional application claims priority under 35 U.S.C. §119(a) on Patent Application No. 2012-221081 filed in Japan on Oct. 3, 2012, the entire contents of which are hereby incorporated by reference.

TECHNICAL FIELD

The present invention relates to a method of manufacturing a transparent sesquioxide sintered body having light-transmitting properties in visible region and/or infrared region and a transparent sesquioxide sintered body manufactured by the manufacturing method. Particularly, the invention relates to a method of manufacturing a transparent sesquioxide sintered body which is utilized for optical uses such as solid-state laser medium, electron-beam scintillator material, magnetooptical device material, arc tube, light refractive index window material, etc.

BACKGROUND ART

Since $M_2O_3$ type sesquioxide sintered bodies belong to the cubic system of space group, like the garnet structure represented by YAG sintered bodies or the like, they are free of optical anisotropy. Theoretically, therefore, the $M_2O_3$ type sesquioxide sintered bodies with high linear transmission properties are expected to be obtainable. In addition, unlike the sintered bodies of garnet structure materials, the $M_2O_3$ type sesquioxide sintered bodies do not need any B site element which will not directly contribute to the above-mentioned optical uses. Therefore, it is expected that the addition concentration of a specified element for exhibiting an optical function can be enhanced. Furthermore, it is expected that $M_2O_3$ type sesquioxide sintered bodies in which at least two elements selected from the group consisting of Y and the lanthanide elements are dissolved in arbitrary atomic ratio on a solid basis can be obtained in a stable manner. This leads to an expectation that the degree of freedom in designing a transparent sintered body exhibiting an optical function can be enhanced remarkably. Accordingly, developments of the $M_2O_3$ type sesquioxide sintered bodies have been made vigorously in recent years.

For instance, JP-A H05-330912 (Patent Document 1) discloses polycrystalline transparent $Y_2O_3$ ceramics for laser use wherein the porosity of the sintered body is up to 1%, the average particle diameter is in the range from 5 to 3000 μm, and at least one lanthanide element is contained. It is described in the document that polycrystalline transparent $Y_2O_3$ ceramics for laser use which permit enhancement of the concentration of a luminous element (particularly, Nd) and enhancement of the uniformity of the inside of the sintered body can be obtained.

Besides, JP-A H06-211573 (Patent Document 2) discloses a transparent $Y_2O_3$ sintered body. For obtaining the sintered body, a $Y_2O_3$ powder is used which has a purity of at least 99.8 wt %, has a primary particle average diameter in the range from 0.01 to 1 μm, and which shows a theoretical sintered body density of at least 94% when molded at a hydrostatic pressure of 500 kg/cm$^2$ and sintered at normal temperature at 1600° C. for three hours. The $Y_2O_3$ powder is kneaded and dried, is then molded into a predetermined shape, and the molded body is sintered in oxygen, hydrogen, or a vacuum of up to $10^{-4}$ Torr in a temperature range of 1800 to 2300° C. for at least three hours, to obtain the transparent $Y_2O_3$ sintered body. It is described in the document that by this method, a transparent $Y_2O_3$ sintered body can be obtained while using a material system not including $ThO_2$, which is radioactive, or while using only a pure $Y_2O_3$ powder not containing LiF, BeO or the like.

Further, JP-A H11-157933 (Patent Document 3) discloses a transparent ceramic including a dense polycrystalline sintered body which has a composition formula $R_2O_3$ (R is at least one member selected from among yttrium and lanthanoids) and an average particle diameter of up to 50 μm (exclusive of 0 μm). It is described in the document that the transparent ceramic promises provision of arc tubes and high-voltage discharge lamps with long life.

Furthermore, JP 4033451 (Patent Document 4) discloses a light-transmitting rare earth oxide sintered body having an average particle diameter of 2 to 20 μm. The sintered body is represented by the general formula $R_2O_3$ (R is at least one member of the group consisting of Y, Dy, Ho, Er, Tm, Yb, and Lu), has a linear transmittance of at least 80% at sintered body thickness of 1 mm in the wavelength range of 500 nm to 6 μm excluding the unique absorption wavelength thereof, has an Al content of 5 to 100 ppm by weight on metal basis, and has a Si content of up to 10 ppm by weight on metal basis. It is described in the document that a transparent $R_2O_3$ sintered body wherein a sintering assistant would not be segregated as a different phase can be obtained.

In addition to the above, JP-A 2008-143726 (Patent Document 5) discloses a polycrystalline transparent $Y_2O_3$ ceramic for electron-beam fluorescence including a polycrystalline sintered body containing $Y_2O_3$ as a main ingredient. The polycrystalline sintered body has a porosity of up to 0.1%, has an average crystal particle diameter of 5 to 300 μm, and contains a lanthanide element. It is described in the document that a transparent $Y_2O_3$ ceramic for electron-beam fluorescence enabling uniform distribution of a fluorescent element and addition of the element in a high concentration can be obtained.

Besides, JP-A 2009-23872 (Patent Document 6) discloses a method of manufacturing a transparent $M:Y_2O_3$ sintered body (M is at least one element selected from the group consisting of Ce, Pr, Nd, Pm, Sm, Eu, Gd, Tb, Dy, Ho, Er, Tm, Yb, Ti, V, Cr, Mn, Fe, Co, and Ni). The method includes: a step of preparing a starting solution including $Y(NO_3)_3$ and a nitrate of M (M is the selected element); a step of adding an aqueous $NH_3$ solution to the starting solution; a step of further adding $(NH_4)_2SO_4$ to the reaction solution obtained by the above-mentioned step; a step of calcining a powder obtained from the reaction solution; a step of molding the calcined powder; and a step of sintering the molded powder. It is described in the document that it is possible to provide, by the method, an $M:Y_2O_3$ sintered body applicable to laser medium, at a comparatively low temperature, speedily, and without using any special apparatus.

Furthermore, JP-A 2007-334357 (Patent Document 7) discloses a refractive, transmissive or diffractive optical element having a three-dimensional structure which contains a ceramic comprised of a combination of crystals, with the single microcrystal thereof resembling that of $Y_2O_3$, is transparent to visible rays and/or infrared rays, and contains one or more oxides of $X_2O$, type. It is described in the document that a lens element free of absorption in the visible band can be obtained.

Recently, JP-A 2011-121837 (Patent Document 8) has disclosed a light-transmitting terbium oxide sintered body for magnetooptical element which is a cubic polycrystalline sintered body containing $Tb_2O_3$ as a main ingredient. The sintered body has a porosity of up to 0.2%, has linear transmittances at wavelengths of 1.06 µm and 532 nm per 3 mm length of at least 70%, and contains at least $2\times10^{22}$ $Tb^{3+}$ ions per 1 $cm^2$. It is described in the document that it is possible to provide a sintered body with excellent light transmission properties, which is free of absorption in a wavelength range of 400 to 1100 nm, except for the absorption in a narrow width near 500 nm attributable to the trivalent terbium ions.

In this way, developments of $M_2O_3$ type sesquioxide sintered bodies have been made vigorously in recent years.

CITATION LIST

Patent Document 1: JP-A H05-330912
Patent Document 2: JP-A H06-211573
Patent Document 3: JP-A H11-157933
Patent Document 4: JP 4033451
Patent Document 5: JP-A 2008-143726
Patent Document 6: JP-A 2009-23872
Patent Document 7: JP-A 2007-334357
Patent Document 8: JP-A 2011-121837

DISCLOSURE OF INVENTION

However, while a large number of reports or proposals have been made concerning developments of $M_2O_3$ type sesquioxide sintered bodies as above-mentioned, none of them involves strict control of the particle diameter of the starting material, and specific ranges of control have been left unclear. In fact, in such circumstances, there has been a problem that when very fine starting material particles of nano size prepared by a newest technology are used, it is difficult to stably obtain a light-transmitting $M_2O_3$ type sesquioxide sintered body with quality on a truly practical level.

The present invention has been made in consideration of the above-mentioned circumstances. Accordingly, it is an object of the present invention to provide a method of manufacturing a transparent sesquioxide sintered body by which a transparent $M_2O_3$ type sesquioxide sintered body with quality at a practical level can be obtained in a stable manner, and a transparent sesquioxide sintered body which can be obtained by the manufacturing method.

Meanwhile, in the manufacture of a light-transmitting $M_2O_3$ type sesquioxide sintered body, naturally, the purity of the used material, the kind of the element or elements selected, and the blending ratios of the elements are important factors. There is another essential fact, however, that control of the particle size of the starting material used is an extremely important factor. For instance, in actual manufacture of light-transmitting $M_2O_3$ type sesquioxide sintered bodies, when large gas voids (pores) of micrometer order in size are present in the sintered body, it produces a problem even if the presence percentage of the voids (porosity) is up to 1%, or up to 0.2%, or even up to 0.1%. In such situations, the micrometer-sized large voids causes the sintered body to appear cloudy to the naked eye, so that the quantity of light transmitted through the sintered body is markedly reduced, and light transmission properties sufficient for practical use cannot be obtained. Besides, the size of the remaining gas voids (pores) is considered to have correlation with the particle size of the starting material used, to some extent. In addition, where the raw material powder is extremely fine, for instance, in the case of nano powder having an average particle diameter on the order of several tens of nanometers, the state of existence thereof is extremely instable. Normally, the fine powder cannot exist as dispersed primary particles, and are liable to form agglomerates. Moreover, in the case of a fine nano powder with a small average particle diameter, the agglomerates tend to be rigid agglomerates (aggregates), often producing a difference between the nominal particle diameter specified by the supplier and the practical average particle diameter of the secondary particles aggregated rigidly. Furthermore, in the case of manufacturing an $M_2O_3$ type sesquioxide sintered body by use of such a nano-sized superfine powder, the secondary agglomerate state is instable and varied from lot to lot, making it difficult to stably manufacture a light-transmitting sintered body with good quality.

Nevertheless, some of the above-mentioned prior art documents lack at all any description relating to the particle size of the starting material to be used (for example, Patent Documents 4 and 7). The other ones of the prior art documents do contain a certain degree of description on the particle size of the starting material. A study of the descriptions, however, reveals that the disclosed information is very obscure, and it cannot be said that strict control is being made in the technologies disclosed.

For instance, Examples of Patent Document 1 and Patent Document 5 describe the use as starting materials a $Y_2O_3$ powder with a particle diameter of 0.1 to 0.5 µm and a lanthanide element oxide with a particle diameter of up to 0.5 µm, and also describe that the raw materials are blended in a pot mill for 24 hours. However, these documents lack a description on the final lower limit value or a mode value or the like of the particle diameter of the raw materials to be used.

The claims of Patent Document 2 and the detailed description of the invention of Patent Document 3 specify the average particle diameter of the starting primary particles to be used, by even indicating the range 0.01 to 1 µm or the range 0.01 to 0.5 µm for the average particle diameter. It is to be noted here, however, that when the present inventors actually obtained the $Y_2O_3$ powders as much as possible, it was found extremely difficult to obtain a powder with an average particle diameter of 10 nm in pure meaning. Particles of 10 nm in size have extremely large specific surface areas. Especially, such oxides as $Y_2O_3$ show large changes with time, through reaction with carbon dioxide or moisture in air. Therefore, it is difficult to maintain stable raw material properties in such situations. In addition, a powder with small primary particles and with high dispersibility (non-agglomerating properties) has difficulties on a handling basis (scattering into the air, difficulty in molding, poor filling density in molded bodies, etc.), so that it is practically impossible to apply such a powder to industrial-level uses. Besides, even in the case of a $Y_2O_3$ powder with an effective measured average particle diameter on 100 nm level, actual production of light-transmitting ceramics by use of the powder resulted in generation of large gas voids (pores) of micrometer size; therefore, it was difficult to obtain a light-transmitting ceramic sintered bodies with quality suitable for practical use.

In addition, Patent Document 6 discloses SEM photographs of the raw material used, which shows that extremely fine raw material particles of 80 to 600 nm were used. It should be noted, however, that the thickness of the sintered pellet produced is not described and hence unknown, and the light transmission spectrum of the pellet (at least not rod-shaped but flat-structured) is not so good (about 50% transmittance).

Patent Document 8 contains a description that a starting material powder with an average particle diameter in the range from submicron to several tens of micrometers (which are extremely practical values) is used and the powder is pulverized and mixed over one day by use of an organic-solvent wet ball mill. This description is quite rational and has reality, but there is no description of the net particle diameter of the powder used after the pulverization. Therefore, while it can be said that the duration of mixing by the ball mill is under control, but the specifications of the powder for producing a sintered body with good quality are unclear, since there is no description on the particle diameters (of the primary particles and secondary particles) used at the final stage (sintering).

A study of the related art documents as cited references shows that in the case of handling a submicron-level raw material powder, especially, a superfine raw material powder at the level of several tens of nanometers, the powder is liable to form rigid secondary agglomerates or aggregates. In view of this physical tendency, it can be presumed that it is practically difficult to stably manufacture a light-transmitting $M_2O_3$ type sesquioxide sintered body, without strict measurement and control of the particle diameters of the raw material (primary particles) and/or the particle diameter of the secondary particles (aggregates) formed by agglomeration (aggregation) of the primary particles.

In order to attain the above object, according to the present invention, there are provided a method of manufacturing a transparent sesquioxide sintered body and a transparent sesquioxide sintered body manufactured by the manufacturing method, as follows.

[1] A method of manufacturing a transparent sesquioxide sintered body comprising:
press molding a raw material powder into a predetermined shape, the raw material powder being a powder mixture of particles of an oxide of at least one rare earth element selected from the group consisting of Y, Sc and lanthanide elements and Zr oxide particles;
and thereafter sintering the press molded body to manufacture a transparent $M_2O_3$ type sesquioxide sintered body where M is at least one rare earth element selected from the group consisting of Y, Sc and lanthanide elements,
wherein in the particle size distribution of the rare earth element oxide particles or in the particle size distribution of secondary particles in the case where the rare earth element oxide particles are aggregated to form the secondary particles, the particle diameter $D_{2.5}$ value at which the cumulative particle amount from the minimum particle size side is 2.5% based on the total particle amount is in the range from 180 nm to 2000 nm, inclusive.

[2] The method of manufacturing a transparent sesquioxide sintered body according to the above paragraph [1], wherein the rare earth element is selected from the group consisting of Y, Sc, Lu, Tb, Yb, Gd, Nd, Eu, Ho, Dy, Tm, Sm, Pr, Ce and Er.

[3] The method of manufacturing a transparent sesquioxide sintered body according to the above paragraph [1] or [2], wherein the raw material powder is a powder mixture of Tb oxide particles, particles of an oxide of at least one rare earth element selected from the group consisting of Y, Sc and lanthanide elements other than Tb and Zr oxide particles, and, the particle size distribution of the rare earth element oxides with the particles being individually the Tb oxide particles and the particles of the oxide of the at least one rare earth element selected from the group consisting of Y, Sc and the lanthanide elements other than Tb, or the particle size distribution of secondary particles in the case where the oxide particles are aggregated to form the secondary particles, has a $D_{2.5}$ value in the range from 180 nm to 280 nm, inclusive, and a $D_{50}$ value or a median diameter of up to 950 nm.

[4] The method of manufacturing a transparent sesquioxide sintered body according to any one of the above paragraphs [1] to [3], wherein the amount of the Zr oxide particles is up to 1% by weight in the raw material powder.

[5] The method of manufacturing a transparent sesquioxide sintered body according to any one of the above paragraphs [1] to [4], wherein a hot isostatic press (HIP) treatment is conducted after the sintering.

[6] A transparent sesquioxide sintered body manufactured by the method of manufacturing a transparent sesquioxide sintered body according to any one of the above paragraphs [1] to [5].

Advantageous Effects of Invention

According to the present invention, it is possible to stably provide a transparent sesquioxide sintered body which does not have therein residual gas voids (pores) detrimental to light transmission properties and which is truly light-transmitting. It is also possible to stably provide a transparent sesquioxide sintered body which is free of cracking in the manufacturing process, does not have therein residual gas voids (pores) detrimental to light transmission properties, and is truly light-transmitting, even in the case of a sesquioxide sintered body of a component system including Tb element which is susceptible to changes in valence.

DESCRIPTION OF EMBODIMENTS

Figure 1:
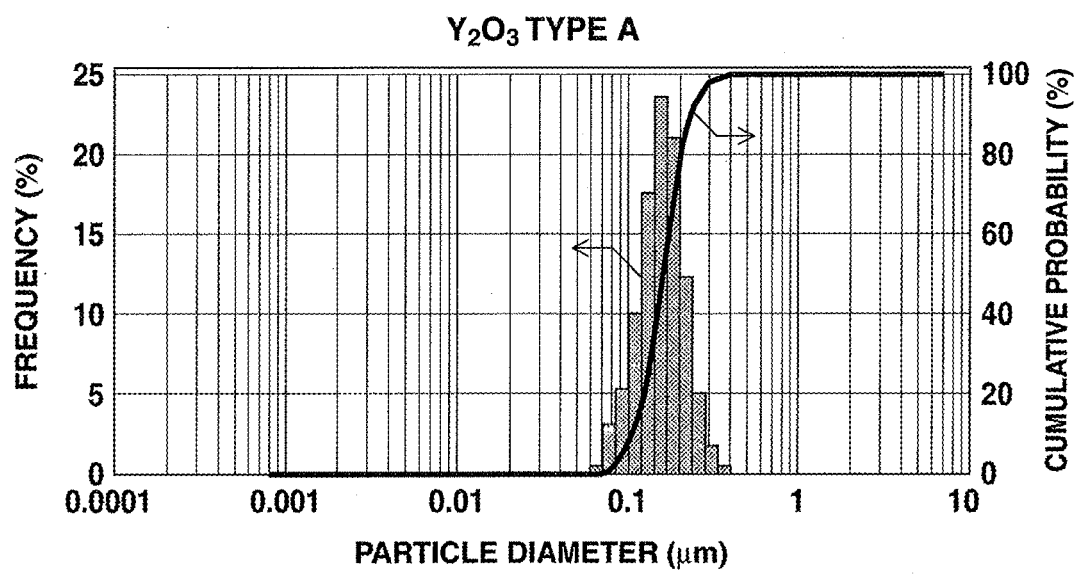
FIG. 1 is a diagram showing the particle size distribution of Type A, which is the finest of $Y_2O_3$ raw material powders.

Now, the method of manufacturing a transparent sesquioxide sintered body according to the present invention will be described below.

The method of manufacturing a transparent sesquioxide sintered body according to the present invention is a method wherein a powder mixture of particles of an oxide of at least one rare earth element selected from the group consisting of Y, Sc and lanthanide elements and Zr oxide particles, the purity being at a commercial level (at least 99.9 wt %), is prepared as a raw material powder, the raw material powder is press molded into a predetermined shape, and the press molded body is sintered to manufacture a transparent $M_2O_3$ type sesquioxide sintered body (M is at least one rare earth element selected from the group consisting of Y, Sc and lanthanide elements, here and hereafter), and wherein in the particle size distribution of the rare earth element oxide particles or in the particle size distribution of secondary particles in the case where the rare earth element oxide particles are aggregated to form the secondary particles, the particle diameter $D_{2.5}$ value at which the cumulative particle amount from the minimum particle size side is 2.5% based on the total particle amount is in the range from 180 nm to 2000 nm, inclusive.

Here, the term "particle diameter" used herein is not the particle diameter value (nominal value) stated by the supplier of the raw material powder, but means the actual particle diameter of the raw material powder. For instance, in the case where the raw material powder has undergone aggregation (agglomeration) to form secondary particles, the term "particle diameter" designates the effective particle diameter of the secondary particles. Further, if the raw material powder is separately subjected to a raw material treatment such as mixing and pulverizing treatments, not the particle diameter value before the treatment but the effective particle diameter value after the treatment should be designated by the term "particle diameter." Along with this designation, the term "particle size distribution" used herein means the particle size distribution according to the actual state of the particles; in the case where the particles have undergone aggregation (agglomeration) to form secondary particles, the particle size distribution of the secondary particles is designated by the term "particle size distribution." Incidentally, the method of measuring the particle diameter is not specifically restricted. However, for example, making reference to a value obtained by dispersing the powdery raw material in a liquid medium and measuring the particle diameter by a light scattering method or a light diffraction method is preferred, since even evaluation of the particle size distribution can be performed thereby.

[Raw Material Powder]

The raw material powder is a powder which is composed of particles of an oxide of at least one rare earth element selected from the group consisting of Y, Sc and lanthanide elements (referred to also as rare earth oxide particles) and Zr oxide particles. Particularly, the powder is preferably composed of particles of an oxide of at least one rare earth element selected from the group consisting of Y, Sc, Lu, Tb, Yb, Gd, Nd, Eu, Ho, Dy, Tm, Sm, Pr, Ce, and Er and Zr oxide particles.

The particles of the oxide(s) of the rare earth element(s) are a powder of rare earth oxide particles for forming the $M_2O_3$ sesquioxide, and specific examples thereof include $Y_2O_3$, $Sc_2O_3$, $Lu_2O_3$, $Tb_4O_7$, $Yb_2O_3$, $Gd_2O_3$, $Nd_2O_3$, $Eu_2O_3$, $Ho_2O_3$, $Dy_2O_3$, $Tm_2O_3$, $Sm_2O_3$, $Pr_6O_{11}$, $CeO_2$, and $Er_2O_3$ powders. The purity of the rare earth oxide particles may be at a commercial level (at least 99.9 wt %).

In addition, as for the powder of the rare earth oxide particles used in the present invention, if the powder particles have undergone agglomeration (aggregation) to form secondary particles, the secondary particles are to be dealt with as the particles constituting the powder on an effective basis. Besides, the shape of the powder particles is not specifically restricted, except for the strict control of the particle diameter. For instance, powders composed of polyhedral, spherical or plate-like particles can be utilized suitably. In addition, powders in which, separate from the rigid secondary particle state (aggregates), comparatively loose agglomerates have been formed from the aggregates, can also be utilized suitably. Furthermore, granular powders prepared by a granulation treatment such as a spray drying treatment can even be utilized suitably.

Besides, it suffices for the powder of the rare earth oxide particles to be in a dry powdery form at the time when it is used in the press molding step. Thus, the powder can be fed through a wet mixing and pulverizing step using a ball mill, a beads mill, a jet mill or the like and a subsequent drying step, at a stage precedent to the press molding step.

The raw material powder for use in the present invention contains a powder of Zr oxide particles, or a $ZrO_2$ powder, other than the powder of the rare earth oxide particles. The addition amount of the $ZrO_2$ powder is preferably up to 1 wt % (exclusive of 0 wt %), and more preferably in the range from 0.01 to 0.5 wt %, inclusive. If the $ZrO_2$ powder is not added at all, there would arise a problem that even if the $D_{2.5}$ value of the starting material powder used (in the case where the powder particles have been agglomerated or aggregated to form secondary particles, the secondary particles are dealt with as the particles constituting the powder effectively, here and hereafter) is at least 180 nm, coalescence of gas voids (pores) during the sintering step is accelerated, to cause growth of the gas voids into coarse voids of micrometer size, whereby light-transmitting property is damaged. Incidentally, if the $ZrO_2$ powder is added in an amount of more than 1 wt %, part of the $ZrO_2$ may be segregated as a second phase inside the $M_2O_3$ type sesquioxide sintered body during the sintering step, thereby possibly damaging the light-transmitting property. Therefore, such an addition is undesirable.

The $ZrO_2$ powder added in the manufacturing method according to the present invention has a purity on the commercial level (at least 99.9 wt %), and its particle size distribution is comparable to or slightly smaller than the particle size distribution of the powder of the rare earth oxide particles, preferably. Incidentally, even where a surface-modified monodispersed superfine powder (in slurry form) with a minimum value of particle size distribution (lower limit of powder size) of 10 nm is used as an ordinarily available $ZrO_2$ powder, the light-transmitting property is not damaged if it is handled by an appropriate method. However, it may become difficult to handle the powder due to heterogeneous aggregation or electrostatic repulsion between powders in the process of taking out the dry $ZrO_2$ powder from the slurry.

Meanwhile, in order to cause a superfine powder of several tens of nanometers in size to exist stably without aggregation, it is normally difficult to attain this object if the superfine powder is in a dry state in air, so that it is a common practice to monodisperse the powder in a slurry state. However, at the stage of conducting the press molding in the present invention, the raw material should be in a solid powder state. Therefore, in the case where a slurry raw material is used, it is necessary to provide a step of drying the raw material at a certain time point. In this instance, in order to handle the superfine powder of several tens of nanometers in size without generation of heterogeneous aggregation or electrostatic repulsion between powders, some knowhow is demanded. In view of this, for example, a secondary particle form $ZrO_2$ powder in which the particles have been favorably dried and pulverized from the beginning and been appropriately aggregated may be utilized. In that case, even in the case of a $ZrO_2$ powder with a nominal value of $D_{50}$ value of 20 nm or 60 nm, the nominal value is the particle diameter of the primary particles; actual measurement of the particle size may sometimes show that the $D_{50}$ value of the $ZrO_2$ powder having been aggregated to form secondary particles is about 700 nm, and the $D_{2.5}$ value is at least 200 nm. In any case, a $ZrO_2$ powder having been aggregated to form secondary particles and having an effective particle size distribution comparable to the particle size distribution of the rare earth oxide particle powder raw material (which normally has also been aggregated to form secondary particles) is preferably selected.

In the present invention, in the particle size distribution of the starting material powder of the oxide particles of the rare earth element used (or the particle size distribution of secondary particles in the case where the rare earth oxide particles are aggregated to form the secondary particles), the $D_{2.5}$ value is in the range from 180 to 2000 nm, inclusive. If the $D_{2.5}$ value is less than 180 nm, coalescence and growth of gas voids would occur during the sintering step to form coarse voids of micrometer size, thereby impairing light-transmitting properties. If the $D_{2.5}$ value is more than 2000 nm, on the other hand, interstices between particles generated upon molding would become too coarse, and, since the particles have already become sufficiently large, the surface free energy of the particles would be reduced. Consequently, sintering proceeds with difficulty, and it becomes difficult to provide a sesquioxide sintered body which is dense and light-transmitting.

In addition, preferably, the above-mentioned raw material powder is a powder composed of Tb oxide particles, particles of an oxide of at least one rare earth element selected from the group consisting of Y, Sc and lanthanide elements other than Tb, and Zr oxide particles, wherein in the particle size distribution of the rare earth oxide particles (the particles are respectively the Tb oxide particles and the particles of the oxide of the at least one rare earth element selected from the group consisting of Y, Sc and lanthanide elements other than Tb, and the particle size distribution is the particle size distribution of secondary particles in the case where the just-mentioned particles are aggregated to form the secondary particles), the $D_{2.5}$ value is in the range from 180 to 280 nm, inclusive, and the $D_{50}$ value is up to 950 nm. If the $D_{2.5}$ value is above 280 nm and/or the $D_{50}$ value is above 950 nm, the relative density of the molded body upon press molding would be easily raised to at least 59%. As a result, it would be impossible to sufficiently secure leak paths for releasing oxygen gas (liberated in the process of a phase change from $Tb_{11}O_{20}$ to $Tb_2O_3$ in the sintering step) to the outside of the sintered body, which increases the internal pressure, possibly causing cracking. Incidentally, in the case of using Pr or Ce oxide particles ($Pr_6O_{11}$, $CeO_2$) in place of the Tb oxide particles, also, in the particle size distribution of rare earth oxide particles (the particles are respectively the Pr oxide particles or Ce oxide particles and the particles of the oxide of at least one rare earth element selected from the group consisting of Y, Sc and lanthanide elements other than Pr or Ce, and the particle size distribution is the particle size distribution of secondary particles in the case where the just-mentioned particles are aggregated to form the secondary particles), the $D_{2.5}$ value is preferably in the range from 180 to 280 nm, inclusive, and the $D_{50}$ value is preferably up to 950 nm.

[Manufacturing Steps]

In the present invention, the above-described raw material powder is press molded into a predetermined shape, after which it is degreased, and is then sintered to manufacture a transparent $M_2O_3$ type sesquioxide sintered body (M is at least one rare earth element selected from the group consisting of Y, Sc and the lanthanide elements). In addition, a hot isostatic press (HIP) treatment is preferably carried out, as required, after the sintering.

Press Molding

In the manufacturing method of the present invention, an ordinary press molding step can be utilized suitably. Specifically, a very common pressing step in which a material placed in a mold is pressed in a predetermined direction, and a CIP (Cold Isostatic Press) step in which a material confined in a deformable waterproof vessel is pressed under a hydrostatic pressure, can be utilized. Incidentally, the pressure to be exerted may be appropriately controlled while checking the relative density of the molded body obtained, and is not specifically limited. For instance, a control to within a pressure range of about up to 300 MPa, which can be coped with by a commercial CIP apparatus, is preferable because the manufacturing cost is suppressed. Or, alternatively, a hot pressing step in which not only molding but also sintering is conducted at a stroke at the time of molding, or a discharge plasma sintering step, a microwave heating step or the like can also be utilized suitably.

Degreasing

In the manufacturing method according to the present invention, an ordinary degreasing step can be utilized suitably. Specifically, a temperature-raising degreasing step by use of a heating furnace can be adopted. In addition, the kind of the atmosphere gas in this case is not specifically restricted; for example, air, oxygen, hydrogen and the like can be used suitably. The degreasing temperature is also not specifically limited. Where an organic component such as a binder has been added, however, it is preferable to raise the temperature to a temperature at which the organic component can be decomposed or removed.

Sintering

In the manufacturing method of the present invention, a common sintering step can be utilized suitably. Specifically, heating sintering steps such as a resistance heating system and an induction heating system can be utilized suitably. The atmosphere in this instance is not specifically restricted; for example, an inert gas, oxygen, hydrogen, vacuum and the like can be utilized suitably.

The sintering temperature in the sintering step in the present invention is preferably at least 1200° C., more preferably at least 1300° C., and further preferably at least 1400° C. If the sintering temperature is below 1200° C., an increase in the denseness of the $M_2O_3$ type sesquioxide sintered body would be insufficient, and the desired light-transmitting $M_2O_3$ type sesquioxide sintered body cannot be obtained. Incidentally, there is no special upper limit to the sintering temperature. However, when sintering is conducted at up to the temperature at which a phase change to a phase other than the cubic crystal intrinsic of the oxide of the lanthanide element selected takes place, phase change from a non-cubic crystal to the cubic crystal does not take place in practice; therefore, a merit is obtained in that optical strain or cracking or the like would not occur easily in the material.

Hot Isostatic Press (HIP)

In the manufacturing method according to the present invention, an after-step such as a hot isostatic press (HIP) step is provided, as required, after the sintering step. Particularly, in the case of a $M_2O_3$ type sesquioxide sintered body which has failed to exhibit light-transmitting properties even after completion of the sintering step, it is possible, by progress to the HIP treatment, to remove gas voids from the inside of the sintered body and thereby easily obtain the desired light-transmitting properties, which is desirable. The kind of the pressurization gas medium which can be suitably used in this instance include inert gases such as argon, and Ar—$O_2$ gas. Incidentally, as the pressure exerted in this case, a pressure of up to 196 MPa, which can be dealt with by a commercial HIP apparatus, is easy to use and desirable. Besides, the treating temperature in this instance may be appropriately set according to the sintered state of the material; it is indispensable, however, that the temperature is up to the above-mentioned phase transition point.

Optical Polishing

In the manufacturing method according to the present invention, both end faces on the axis for optical use of the $M_2O_3$ type sesquioxide sintered body having undergone the sintering step are preferably subjected to optical polishing. The optical surface accuracy in this instance is preferably up to $\lambda/8$, more preferably up to $\lambda/10$ in the case of measurement wavelength $\lambda=633$ nm. Incidentally, the optically polished surfaces may be coated, as required, with an antireflective film, which enables accurate optical measurement.

According to the method of manufacturing a transparent sesquioxide sintered body of the present invention as above-described, a transparent sesquioxide sintered body which is free of residual gas voids (pores) detrimental to light-transmitting properties and is truly light-transmitting can be provided stably and with extremely good reproducibility. In addition, according to the present invention, even in the case where the raw material powder contains Tb oxide particles, a transparent sesquioxide sintered body which has little gas voids detrimental to light transmission properties, has sufficiently small void sizes, and is truly light-transmitting can be provided with extremely high reproducibility without cracking occurred in the manufacturing process.

In the manufacturing method according to the present invention, the transparent $M_2O_3$ type sesquioxide sintered body obtained can be appropriately assembled into a device in conformity with the intended optical use.

EXAMPLES

Now, the present invention will be described further in detail below by showing Examples and Comparative Examples, but the invention is not to be restricted to the Examples.

Test Example 1

Description will be made of an example in which a $Y_2O_3$ powder was used as a raw material powder.

Figure 2:
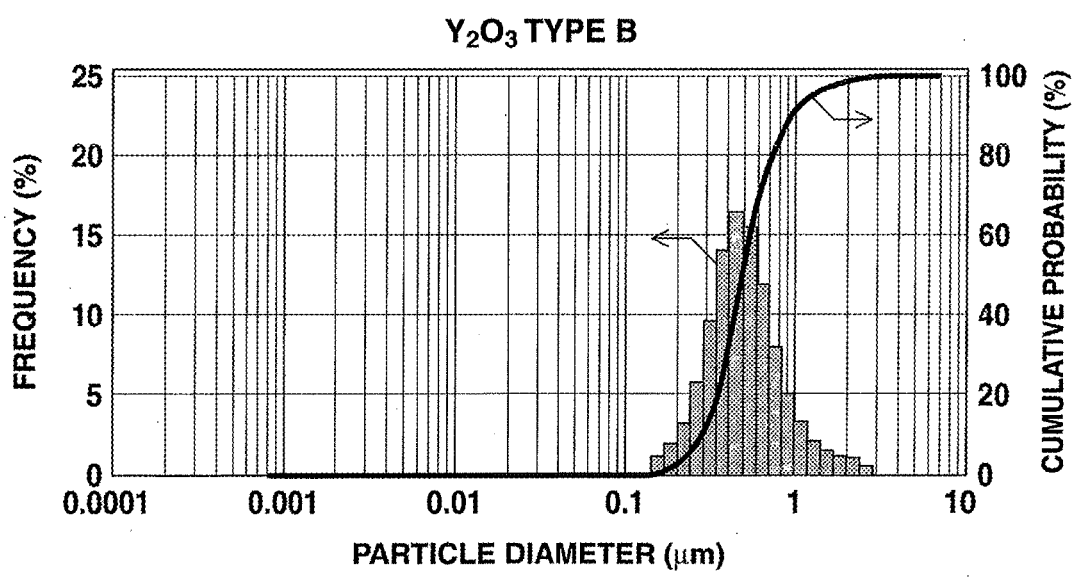
FIG. 2 is a diagram showing the particle size distribution of Type B, of the $Y_2O_3$ raw material powders.

Here, five kinds of $Y_2O_3$ powders differing in particle size distribution (Types A, B, C, D and E, produced by Shin-Etsu Chemical Co., Ltd.) were obtained. Each of the $Y_2O_3$ powders had a purity of at least 99.9 wt %. Of the raw material powders thus obtained, Types A and E were each subjected to calcination in air at 1000° C. and at 1200° C. for three hours, while Type B was subjected to calcination in air at 1000° C. for three hours, to prepare respective calcined powders having been coarsened in effective particle sizes through necking. Each of the powdery raw materials thus prepared was dispersed in ethanol, and its particle size distribution was measured by use of particle size analyzers (Microtrac MT3000II and Nanotrac UPA, produced by Nikkiso Co., Ltd.). FIG. 1 shows a measurement example of particle size distribution of Type A, while FIG. 2 shows a measurement example of particle size distribution of Type B. In addition, for each of the measurement results of the raw material powders, the particle diameter $D_{2.5}$ value at which the cumulative particle amount from the minimum particle size side is 2.5% based on the total particle amount in the particle size distribution was determined; similarly, $D_{50}$ value and $D_{95}$ value were also determined. The results are set forth in Table 1 below.

TABLE 1

| Powder No. | $Y_2O_3$ raw material powder | | Particle diameter (nm) | | |
|---|---|---|---|---|---|
| | Type | Calcination | $D_{2.5}$ | $D_{50}$ | $D_{95}$ |
| 1 | A | not conducted | 85 | 175 | 260 |
| 2 | A | 1000° C. | 125 | 500 | 935 |
| 3 | A | 1200° C. | 150 | 550 | 1220 |
| 4 | B | not conducted | 180 | 480 | 1230 |
| 5 | B | 1000° C. | 200 | 700 | 1440 |
| 6 | C | not conducted | 240 | 930 | 2050 |
| 7 | D | not conducted | 570 | 1000 | 1740 |
| 8 | E | not conducted | 1260 | 3280 | 6870 |
| 9 | E | 1000° C. | 2000 | 5620 | ≥10000 |
| 10 | E | 1200° C. | 2540 | 6320 | ≥10000 |

Each of the powdery raw materials as above was admixed with 0.5 wt % of one kind of $ZrO_2$ powder (powder No. A, of normal dry type) produced by Daiichi Kigenso Kagaku Kogyo Co., Ltd. Besides, only the $Y_2O_3$ powder Type C was admixed with another $ZrO_2$ powder (powder No. B, of surface-modified monodispersed slurry type) produced by Daiichi Kigenso Kagaku Kogyo Co., Ltd. in an amount of 0.5 wt % as $ZrO_2$ powder, to prepare a mixed raw material. Incidentally, the $ZrO_2$ powder (and the $ZrO_2$ particles in the slurry) thus added was subjected to measurement of particle size distribution by dispersing it in ethanol and using the above-mentioned particle size analyzers. The results are shown in Table 2 below.

TABLE 2

| Powder No. | $ZrO_2$ raw material powder | Particle diameter (nm) | | |
|---|---|---|---|---|
| | Type | $D_{2.5}$ | $D_{50}$ | $D_{95}$ |
| A | normal | 240 | 730 | 1840 |
| B | surface-modified | 12 | 19 | 45 |

Next, each of the $Y_2O_3$ mixed powder raw materials obtained as above was placed in a mold having a diameter of 10 mm, and was tentatively molded into a 20 mm-long rod-like shape by use of a uniaxial press molding machine, after which the tentatively molded body was pressed at a hydrostatic pressure of 198 MPa, to obtain a CIP molded body. Subsequently, the CIP molded body thus obtained was placed in a muffle furnace, and was degreased by a thermal treatment in air at 800° C. for three hours.

Subsequently, the degreased molded body was placed in a vacuum heating furnace, the temperature was raised at a rate of 100° C./h to a temperature of 1600 to 1700° C., at which the molded body was held for three hours, and then the temperature was lowered at a rate of 600° C./h, to obtain a sintered body. In this case, the sintering temperature and holding time were controlled so that the relative densities of all the sintered samples would be roughly the same value of 95%. In addition, the sintering start temperatures for all the samples were recorded.

Each of the sintered bodies thus obtained was cut into two pieces, each cut surface was subjected to optical polishing, and each piece was subjected to a thermal etching treatment at 1500° C. for two hours. For each of the samples thus obtained, the sintered particle diameter and the size of gas voids (pores) present in the optically polished surface were evaluated by electron microscope (SEM) observation (the sintered particle diameter was observed on a reflected electron image, while the gas void size was observed on a secondary electron image). The results are set forth in Table 3 below. Incidentally, typical temperature Ts is defined as follows. For a plurality of degreased molded body samples, post-degreasing relative density is preliminarily measured simply from shape and weight, and the average value (average post-degreasing relative density) of the measured values is preliminarily determined. Then, all the samples are each sintered by holding at a certain sintering temperature for one to three hours, followed by cooling the samples and taking them out. Thereafter, for each of all the samples, the post-sintering relative density is again measured simply from the shape and weight. The sintering temperature in the case where the average of the re-measured values shows an increase of 3 to 5% as compared with the average post-degreasing relative density is taken as the typical temperature Ts. Thus, the typical temperature Ts is the sintering start temperature at which it is possible to confirm that an increase in denseness is started securely in the sintering step (a substantial denseness increase start temperature). Here, the sintering start temperature for the mixed powder of Type B (roughly middle in the particle size distribution of main raw material powder) with the normal dry type $ZrO_2$ powder is taken as the typical temperature Ts, and the sintering start temperatures for the mixed powders with other particle size distribution are indicated by temperature differences in relation to the typical temperature Ts (the same applies also to the test examples below).

Figure 3:
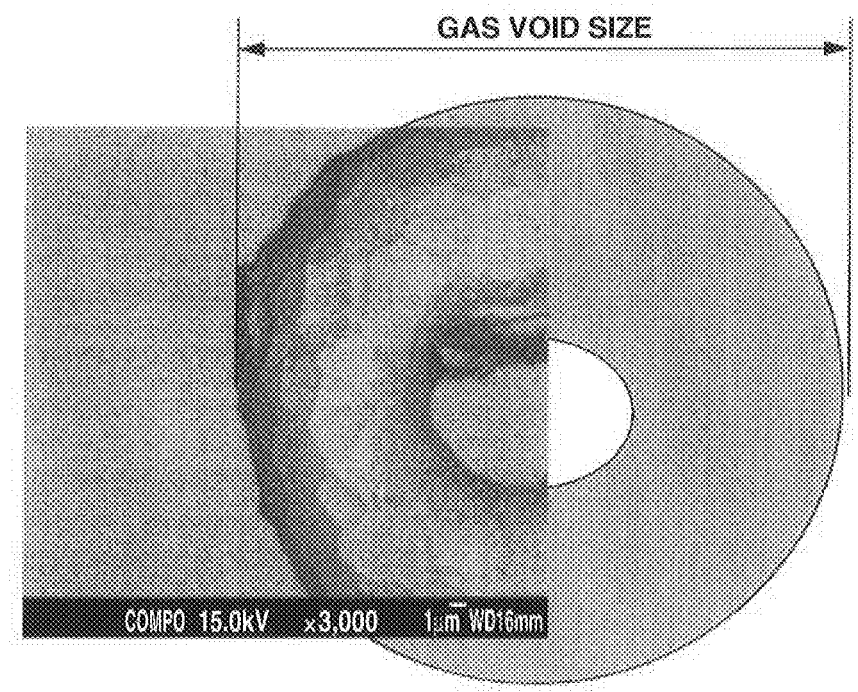
FIG. 3 is a schematic view based on an SEM image showing a gas void (pore) grown inside a sintered body obtained using $Y_2O_3$ Type A (Powder No. 1A) in Test Example 1.

Besides, typical gas void (pore) images are shown in FIGS. 3 to 7. Such typical void images were present throughout the optically polished surfaces of the respective samples. In addition, FIG. 3 shows the manner in which the gas void size was determined from the SEM image on the assumption that the voids were circular in profile.

Next, each of the samples of the sintered bodies which were not bisected was subjected to an HIP treatment at a temperature of 1600 to 1700° C. and a pressure of 98 to 198 MPa for three hours by use of Ar gas as a pressurization medium. The HIP-treated samples thus obtained were put to observation of external appearance, and were subjected to grinding and polishing so as to be 14 mm in length. Subsequently, both optical end faces of each of the samples were subjected to final optical polishing with an optical surface accuracy of $\lambda/8$ (measurement wavelength $\lambda=633$ nm), and, further, coated with an antireflective film. The thus treated samples were subjected to measurement of transmittance at an antireflective film design center wavelength of 600 nm, and the measured values were each reduced to transmission loss per unit length of sintered body. The results are set forth in Table 4 below. While the results obtained here correspond to an example at the wavelength of 600 nm, the present invention is not restricted in any way to these results. The reason is as follows. The center wavelength for the antireflective film can be designed in an arbitrary manner. The center wavelength in designing the antireflective film can in principle be matched not only to the wavelength of 600 nm adopted in this case but also to any value in a wide wavelength range of from 450 nm to 2000 nm, exclusive of the respective specific absorption wavelength bands intrinsic of the rare earth elements of Y, Sc, Lu, Tb, Yb, Gd, Nd, Eu, Ho, Dy, Tm, Sm, Pr, Ce and Er, whereby results equivalent or similar to the transmission losses obtained in this case can be obtained. This holds true also in the cases of further addition of other rare earth element oxides, in the cases of changes to other rare earth element oxides, and in the cases of different rare earth element oxides being mixed together.

TABLE 3

Figure 4:
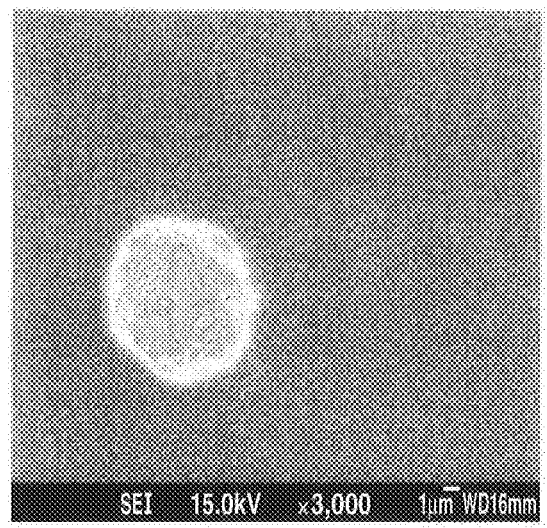
FIG. 4 is an SEM image showing a gas void grown inside a sintered body obtained by calcining $Y_2O_3$ Type A at 1000° C. (Powder No. 2A) in Test Example 1.
Figure 5:
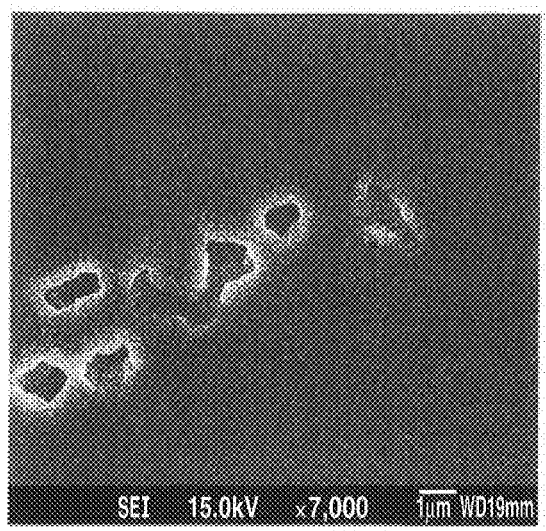
FIG. 5 is an SEM image showing a gas void grown inside a sintered body obtained by calcining $Y_2O_3$ Type A at 1200° C. (Powder No. 3A) in Test Example 1.
Figure 6:
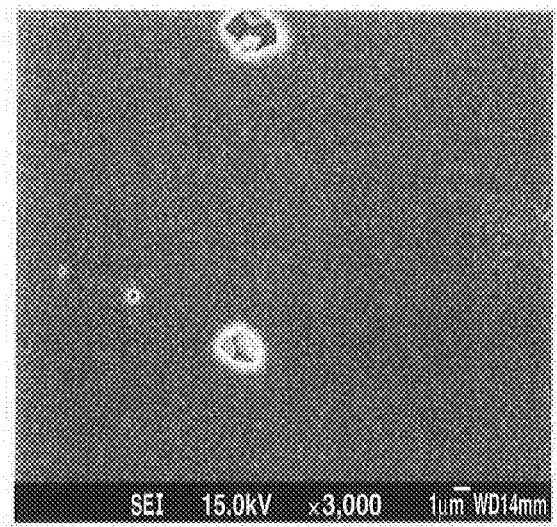
FIG. 6 is an SEM image showing a gas void grown inside a sintered body obtained using $Y_2O_3$ Type B (Powder No. 4A) in Test Example 1.
Figure 7:
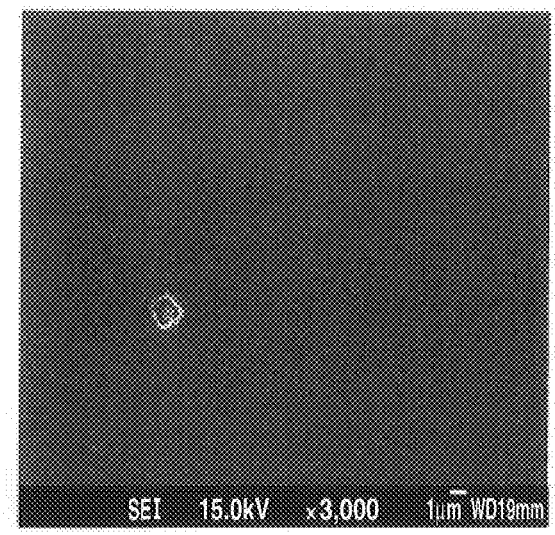
FIG. 7 is an SEM image showing a gas void grown inside a sintered body obtained using $Y_2O_3$ Type C (Powder No. 6A) in Test Example 1.

| Powder No. | $Y_2O_3$ raw material powder Type | $Y_2O_3$ raw material powder Calcination | $ZrO_2$ raw material powder Type | Sintering start temperature (° C.) | Average sintered particle diameter (μm) | Gas voids Size (μm) | Gas voids Reference figure |
|---|---|---|---|---|---|---|---|
| 1A | A | not conducted | normal | Ts − 200 | 2.0 | 40 | FIG. 3 |
| 2A | A | 1000° C. | normal | Ts − 150 | 2.0 | 8 | FIG. 4 |
| 3A | A | 1200° C. | normal | Ts − 100 | 2.0 | 4 | FIG. 5 |
| 4A | B | not conducted | normal | Ts | 1.5-2.0 | 2 | FIG. 6 |
| 5A | B | 1000° C. | normal | Ts | 1.5-2.0 | 2 | — |
| 6A | C | not conducted | normal | Ts | 1.5 | 1 | FIG. 7 |
| 6B | C | not conducted | surface-modified | Ts | 1.5 | 1 | — |
| 7A | D | not conducted | normal | Ts | 1.5 | 1 | — |
| 8A | E | not conducted | normal | Ts + 80 | 3.5 | 1 | — |
| 9A | E | 1000° C. | normal | Ts + 150 | 5.5-6.0 | 2.5 | — |
| 10A | E | 1200° C. | normal | Ts + 200 | 6.0-6.5 | 5 | — |

Ts: typical temperature

TABLE 4

| Powder No. | $Y_2O_3$ raw material powder Type | $Y_2O_3$ raw material powder Calcination | $ZrO_2$ raw material powder Type | External appearance | Visible-region transmittance (length 14 mm) | Reduced visible-region transmission loss |
|---|---|---|---|---|---|---|
| 1A | A | not conducted | normal | cloudy, opaque | less than 5% | unmeasurable |
| 2A | A | 1000° C. | normal | cloudy, opaque | less than 5% | unmeasurable |
| 3A | A | 1200° C. | normal | translucent | 13% | 6.2%/mm |
| 4A | B | not conducted | normal | transparent | 95.5% | 0.3%/mm |
| 5A | B | 1000° C. | normal | transparent | 96.5% | 0.25%/mm |
| 6A | C | not conducted | normal | transparent | 96% | 0.3%/mm |

TABLE 4-continued

| Powder No. | Y$_2$O$_3$ raw material powder Type | Y$_2$O$_3$ raw material powder Calcination | ZrO$_2$ raw material powder Type | External appearance | Visible-region transmittance (length 14 mm) | Reduced visible-region transmission loss |
|---|---|---|---|---|---|---|
| 6B | C | not conducted | surface-modified | transparent | 94% | 0.4%/mm |
| 7A | D | not conducted | normal | transparent | 97% | 0.2%/mm |
| 8A | E | not conducted | normal | transparent | 96.5% | 0.25%/mm |
| 9A | E | 1000° C. | normal | transparent | 93% | 0.5%/mm |
| 10A | E | 1200° C. | normal | cloudy, opaque | less than 5% | unmeasurable |

From these results it is seen that when the particle diameter $D_{2.5}$ value at which the cumulative particle amount from the minimum particle size side is 2.5% based on the total particle amount in the particle size distribution of the Y$_2$O$_3$ powder used as the starting material is at least 180 nm, the growth of gas voids after vacuum sintering is suppressed to up to 2 μm. It was also confirmed that when an HIP treatment is further conducted, it is possible to obtain an M$_2$O$_3$ type sesquioxide sintered body which is truly transparent as represented by a transmittance of at least 93% (a reduced loss of up to 0.5%/mm) for a 14 mm-long rod-shaped sample provided with an antireflective film (Powder Nos. 4A to 9A). Discussing more strictly, it is presumed that for the vacuum sintered samples with the gas void size suppressed to up to the sintered particle diameter, the surface free energy of the voids is suppressed to up to the surface free energy of the particles, and, hence, the gas voids can be removed by the compressive forces in the subsequent HIP treatment step, whereby a dense M$_2$O$_3$ type sesquioxide sintered body with a transmittance at a truly transparent level could be obtained. The lower limit of this tendency is considered to correspond to the case wherein the particle diameter $D_{2.5}$ value at which the cumulative particle amount from the minimum particle size side is 2.5% based on the total particle amount in the particle size distribution of the Y$_2$O$_3$ powder used as the starting material is 180 nm (Powder No. 4A). Incidentally, when the particle diameter $D_{2.5}$ value at which the cumulative particle amount from the minimum particle size side is 2.5% based on the total particle amount in the particle size distribution of the Y$_2$O$_3$ powder used as the starting material was increased to 2540 nm as the particles are coarsened (Powder No. 10A), only a sintered body which is cloudy and opaque to the naked eye could be obtained. Furthermore, an analysis of the SEM image of this sample revealed that the sintered particle diameter was little different from the starting material particle diameter $D_{50}$ value; in other words, particle growth did not take place during the sintering step, and, moreover, innumerable pores (gas voids) were observed in the grain boundaries. A rise in the sintering start temperature was also confirmed. Thus, it is considered that if the starting material is too coarse, sinterability would be poor and an increase in denseness would progress with difficulty.

Now, the effect of the addition of Zr oxide will be discussed below.

First, a Y$_2$O$_3$ powder (Type B) produced by Shin-Etsu Chemical Co., Ltd. Was obtained. The powder had a purity of at least 99.9 wt %. This powdery raw material was dispersed in ethanol, and its particle size distribution was measured by use of the particle size analyzers (Microtrac MT3000II and Nanotrac UPA, produced by Nikkiso Co., Ltd.). Of the measurement results thus obtained, the particle diameter $D_{2.5}$ value at which the cumulative particle amount from the minimum particle size side is 2.5% based on the total particle amount in the particle size distribution is shown in Table 5 below, together with the $D_{50}$ value and the $D_{95}$ value.

TABLE 5

| Powder No. | Y$_2$O$_3$ mixed raw material powder Type | Y$_2$O$_3$ mixed raw material powder Calcination | Particle diameter (nm) $D_{2.5}$ | Particle diameter (nm) $D_{50}$ | Particle diameter (nm) $D_{95}$ |
|---|---|---|---|---|---|
| 4 | B | not conducted | 180 | 470 | 1240 |

Next, this powdery raw material was divided into two groups. Nothing was added to the former of the groups, while the other of the groups was admixed with 1.5 wt % of one kind of ZrO$_2$ powder (Powder No. A, of normal dry type) produced by Daiichi Kigenso Kagaku Kogyo Co., Ltd. Incidentally, the particle size distribution of the ZrO$_2$ powder added was as shown in Table 2 above.

Each of the two kinds of Y$_2$O$_3$ powdery raw materials thus obtained was placed in a mold having a diameter of 10 mm, was tentatively molded into a 20 mm-long rod-like shape by use of a uniaxial press molding machine, and the tentatively molded body was pressed under a hydrostatic pressure of 198 MPa, to obtain a CIP molded body. Subsequently, the CIP molded body was placed in a muffle furnace, and was degreased by a thermal treatment in air at 800° C. for three hours.

Next, the degreased molded body thus obtained was placed in a vacuum heating furnace, and the temperature was raised at a rate of 100° C./h to a temperature of 1600 to 1700° C. The molded body was held at the raised temperature for three hours, and was cooled at a temperature-lowering rate of 600° C./h, to obtain a sintered body. The sintered body thus obtained was cut into two pieces, each cut surface was put to optical polishing, after which the pieces were subjected to a thermal etching treatment at 1550° C. for two hours. For the sample thus obtained, the sintered particle diameter and the size of gas voids present in the optically polished surface were evaluated by SEM observation (the sintered particle diameter was observed on a reflective electron image, while the gas void size was observed on a secondary electron image). The results are shown in Table 6 below.

TABLE 6

| Powder No. | $Y_2O_3$ raw material powder Type | $Y_2O_3$ raw material powder Calcination | $ZrO_2$ raw material powder Addition | Sintering start temperature (° C.) | Average sintered particle diameter (μm) | Gas voids Size (μm) |
|---|---|---|---|---|---|---|
| 4X | B | not conducted | not added | Ts − 100 | 40 | 2.5 |
| 4Y | B | not conducted | 1.5 wt % | Ts | 1.5-2.0 | 2 |

Ts: typical temperature

Subsequently, of the sintered bodies as above-mentioned, the samples not bisected were each subjected further to an HIP treatment at a temperature of 1600 to 1700° C. and a pressure of 98 to 198 MPa for three hours by use of Ar gas as a pressurization medium. Each of the HIP-treated samples was put to observation of external appearance, and was subjected to grinding and polishing so as to be 14 mm in length. Next, both optical end faces of each of the samples were subjected to final optical polishing with an optical surface accuracy of λ/8 (measurement wavelength λ=633 nm), and were further coated with an antireflective film. Then, transmittance at an antireflective film design center wavelength of 600 nm was measured and evaluated. In addition, of the sample of Powder No. 4X not having been admixed with the Zr oxide, a portion is taken off and subjected to a thermal etching treatment at 1550° C. for two hours. The size of sintered particles appearing on the etched surface of the sample thus obtained and the position of a remaining gas void relative to the sintered particles were investigated by optical microscope observation. The results are set forth in Table 7 below.

TABLE 7

| Powder No. | $Y_2O_3$ raw material powder Type | $Y_2O_3$ raw material powder Calcination | $ZrO_2$ raw material powder Addition | External appearance | Visible-region transmittance (length 14 mm) | Reduced visible-region transmission loss | Gas voids |
|---|---|---|---|---|---|---|---|
| 4X | B | not conducted | not added | translucent | 23% | 5.5%/mm | many in particle*[2] |
| 4Y | B | not conducted | 1.5 wt % | transparent*[1] | 51% | 3.5%/mm | not observed |

Figure 8:
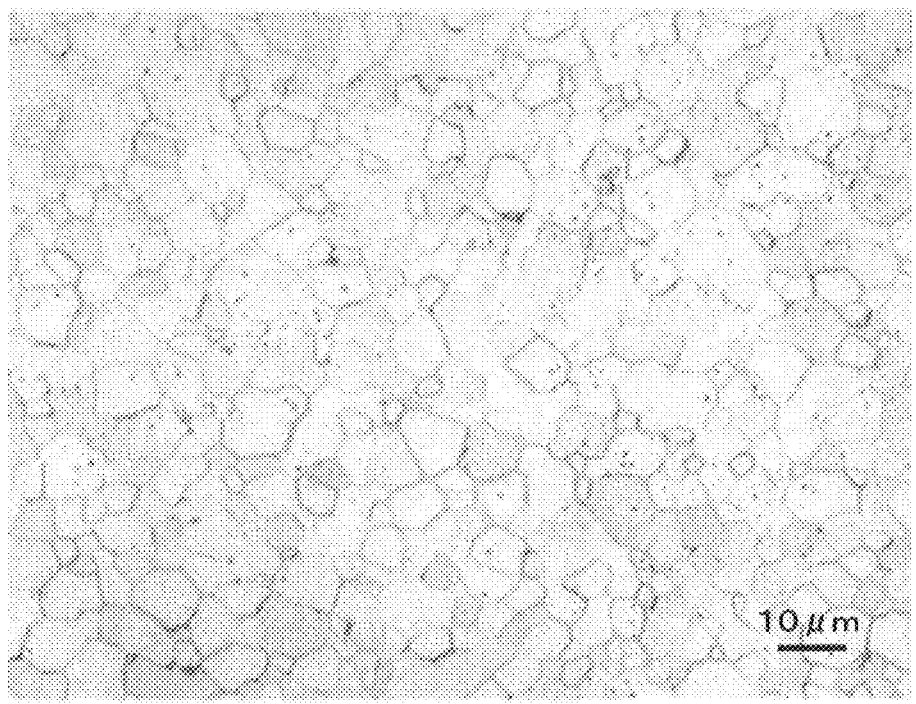
FIG. 8 is an optical microscope photograph showing residual gas voids (pores) inside a sintered body after an HIP treatment of a sintered body obtained using $Y_2O_3$ Type B (Powder No. 4X, without $ZrO_2$ addition) in Test Example 1.

*[1]Fluctuating contrast was present in grain boundaries.
*[2]see FIG. 8 (sintered particle diameter 10 μm)

From the above results, it is seen that even when the particle diameter $D_{2.5}$ value at which the cumulative particle amount from the minimum particle size side is 2.5% based on the total particle amount in the particle size distribution of the $Y_2O_3$ powder used as the starting material was at least 180 nm, the transmittance was markedly spoiled if the addition of $ZrO_2$ as an assistant (sintering aid) was omitted (Powder No. 4X). It is considered that since the particle growth suppressing effect of $ZrO_2$ to be used as the assistant was spoiled, the progress of the sintering was accelerated, and many remaining gas voids were confined in the particles in the process of excessive progress of particle growth, which hampered an increase in denseness, resulting in a lowering in transmittance. It was also revealed that an addition of 1.5 wt % of $ZrO_2$ (Powder No. 4Y) leads to generation of fluctuating contrast in grain boundaries, thereby causing a lowering in transmittance. It is considered that since $ZrO_2$ was added in an excessive amount, a portion of $ZrO_2$ could no longer be homogeneously dissolved in the $Y_2O_3$ sintered body on a solid basis and was segregated to form a $ZrO_2$-rich different phase, and the difference between the refractive index of the different phase and the refractive index of the $Y_2O_3$ sintered body serving as a matrix was observed as a transparent but fluctuating contrast, whereby the transmittance was lowered.

Test Example 2

An example wherein a $Lu_2O_3$ powder was used will be described.

Here, three kinds of $Lu_2O_3$ powders different in particle size distribution (Types A, B, and E, produced by Shin-Etsu Chemical Co., Ltd.) were obtained. Each of the $Lu_2O_3$ powders had a purity of at least 99.9 wt %. Of the raw materials thus obtained, part of Type A was calcined at 1200° C. in air for three hours, while parts of Type E were calcined respectively at 1000° C. and at 1200° C. in air for three hours, to prepare respective powders coarsened in effective particle size through necking. Each of the powdery raw materials thus prepared was dispersed in ethanol, and put to measurement of particle size distribution by use of particle size analyzers (Microtrac MT3000II and Nanotrac UPA, produced by Nikkiso Co., Ltd.). Of the measurement results obtained for each of the samples, the particle diameter $D_{2.5}$ value at which the cumulative particle amount from the minimum particle size side is 2.5% based on the total particle amount in particle size distribution is shown in Table 8 below, together with $D_{50}$ value and $D_{95}$ value.

TABLE 8

| Powder No. | $Lu_2O_3$ raw material powder Type | $Lu_2O_3$ raw material powder Calcination | Particle diameter (nm) $D_{2.5}$ | Particle diameter (nm) $D_{50}$ | Particle diameter (nm) $D_{95}$ |
|---|---|---|---|---|---|
| 11 | A | not conducted | 85 | 175 | 280 |
| 12 | A | 1200° C. | 140 | 550 | 1180 |
| 13 | B | not conducted | 185 | 485 | 1220 |
| 14 | E | not conducted | 1270 | 3210 | 6450 |
| 15 | E | 1000° C. | 1950 | 5120 | ≥10000 |
| 16 | E | 1200° C. | 2460 | 6250 | ≥10000 |

Next, each of all the raw materials as above was admixed with 0.5 wt % of one kind of $ZrO_2$ powder (Powder No. A, of normal dry type) produced by Daiichi Kigenso Kagaku Kogyo Co., Ltd. The particle size distribution of the $ZrO_2$ powder added here was as shown in Table 2 above.

Subsequently, each of all the $Lu_2O_3$ mixed powdery raw materials thus obtained was placed in a mold having a diameter of 10 mm, and tentatively molded into a 20 mm-long rod-like shape by use of a uniaxial press molding machine, followed by pressing at a hydrostatic pressure of 198 MPa, to obtain a CIP molded body. The CIP molded bodies thus obtained were placed in a muffle furnace, and degreased by a heat treatment at 800° C. in air for three hours.

Next, each of the degreased molded bodies thus obtained was placed in a vacuum heating furnace, and the temperature was raised to a value of 1600 to 1700° C. at a rate of 100° C./h.

After held at the raised temperature for three hours, each of the sample bodies was cooled at a rate of 600° C./h, to obtain a sintered body. In this case, the sintering temperature and holding time were so controlled that the sintered relative densities of all the samples were substantially the same value of 95%. In addition, the sintering start temperatures for the respective samples were recorded.

Each of the sintered bodies thus obtained was cut into two pieces, the cut surface was subjected to optical polishing, and each piece was subjected to a thermal etching treatment at 1550° C. for two hours. The samples thus obtained were evaluated as to the sintered particle diameter and the size of gas voids (pores) present in the optically polished surface by SEM observation (the sintered particle diameter was observed on a reflected electron image, while the void size was observed on a secondary electron image). The results are set forth in Table 9 below.

TABLE 9

| Powder No. | $Lu_2O_3$ raw material powder Type | $Lu_2O_3$ raw material powder Calcination | $ZrO_2$ raw material powder Type | Sintering start temperature (° C.) | Average sintered particle diameter (μm) | Gas voids Size (μm) |
|---|---|---|---|---|---|---|
| 11A | A | not conducted | normal | Ts − 200 | 2.0 | 35 |
| 12A | A | 1200° C. | normal | Ts − 100 | 2.0 | 4 |
| 13A | B | not conducted | normal | Ts | 1.5-2.0 | 2 |
| 14A | E | not conducted | normal | Ts + 80 | 3.5 | 1 |
| 15A | E | 1000° C. | normal | Ts + 150 | 5.0-5.5 | 2.5 |
| 16A | E | 1200° C. | normal | Ts + 200 | 6.0-6.5 | 5 |

Ts: typical temperature

Subsequently, of the sintered bodies as above-mentioned, those samples not having been bisected were subjected to an HIP treatment at a temperature of 1600 to 1700° C. and a pressure of 98 to 198 MPa for three hours by use of Ar gas as a pressurization medium. The HIP-treated samples thus obtained were put to observation of external appearance, and were each ground and polished so as to be 14 mm in length. Both optical end faces of each of the thus obtained samples were subjected to final optical polishing with an optical surface accuracy of $\lambda/8$ (measurement wavelength $\lambda=633$ nm), and, further, were coated with an antireflective film, after which transmittance at an antireflective film design center wavelength of 600 nm was measured and evaluated. The results are shown in Table 10 below.

TABLE 10

| Powder No. | $Lu_2O_3$ raw material powder Type | $Lu_2O_3$ raw material powder Calcination | $ZrO_2$ raw material powder Type | External appearance | Visible-region transmittance (length 14 mm) | Reduced visible-region transmission loss |
|---|---|---|---|---|---|---|
| 11A | A | not conducted | normal | cloudy, opaque | less than 5% | unmeasurable |
| 12A | A | 1200° C. | normal | translucent | 11% | 6.4%/mm |
| 13A | B | not conducted | normal | transparent | 96% | 0.3%/mm |
| 14A | E | not conducted | normal | transparent | 96% | 0.3%/mm |
| 15A | E | 1000° C. | normal | transparent | 94.5% | 0.4%/mm |
| 16A | E | 1200° C. | normal | cloudy, opaque | less than 5% | unmeasurable |

From these results it is seen that when the particle diameter $D_{2.5}$ value at which the cumulative particle amount from the minimum particle size side is 2.5% based on the total particle amount in the particle size distribution of the $Lu_2O_3$ powder used as the starting material is at least 185 nm, the growth of gas voids after vacuum sintering is suppressed to up to 2 μm. It was also confirmed that when an HIP treatment is further conducted, it is possible to obtain an $M_2O_3$ type sesquioxide sintered body which is truly transparent as represented by a transmittance of at least 94.5% (a reduced loss of up to 0.4%/mm) for a 14 mm-long rod-shaped sample provided with an antireflective film (Powder Nos. 13A to 15A). In addition, when the particle diameter $D_{2.5}$ value at which the cumulative particle amount from the minimum particle size side is 2.5% based on the total particle size in the particle size distribution of the $Lu_2O_3$ powder used as the starting material is increased to 2460 nm as the particles are coarsened (Powder No. 16A), only a sintered body which is cloudy and opaque to the naked eye could be obtained. Furthermore, an analysis of the SEM image of this sample revealed that the sintered particle diameter was little different from the starting material particle diameter $D_{50}$ value; in other words, particle growth did not take place during the sintering step, and, moreover, innumerable pores (gas voids) were observed in the grain boundaries. Also, a rise in the sintering start temperature was confirmed. Thus, it is considered that if the starting material is too coarse, sinterability would be poor and an increase in denseness would progress with difficulty.

Test Example 3

An example wherein a $Sc_2O_3$ powder was used will be described. In this Test Example 3, in order to confirm that a functional transparent $M_2O_3$ type sesquioxide sintered body can be obtained by addition of a tiny amount of lanthanide element other than Sc to a $Sc_2O_3$ sesquioxide sintered body, a raw material powder obtained by adding a $Yb_2O_3$ powder to a $Sc_2O_3$ powder in an addition amount of 2 wt % was prepared.

Here, for each of $Sc_2O_3$ powder and $Yb_2O_3$ powder, three kinds of powders differing in particle size distribution (Types A, B and E, produced by Shin-Etsu Chemical Co., Ltd.) were obtained. All these powders had a purity of at least 99.9 wt %. Subsequently, the three kinds of $Yb_2O_3$ powders were respectively weighed, and were added respectively to the same types of $Sc_2O_3$ powders in an addition amount of 2 wt %, followed by wet mixing and drying. Of the three kinds of raw materials, parts of Type E were calcined respectively at 1000° C. and 1200° C. in air for three hours, to prepare respective powders having been coarsened in effective particle size through necking. Each of all the powdery raw materials thus prepared was dispersed in ethanol, and put to measurement of particle size distribution by use of particle size analyzers (Microtrac MT3000II and Nanotrac UPA, produced by Nikkiso Co., Ltd.). Of the measurement results obtained for each of the powdery raw materials, the particle diameter $D_{2.5}$ value at which the cumulative particle amount from the minimum particle size side is 2.5% based on the total particle amount in the particle size distribution is shown in Table 11 below, together with $D_{50}$ value and $D_{95}$ value.

TABLE 11

| Powder No. | $Yb_2O_3$-added $Sc_2O_3$ raw material powder | | Particle diameter (nm) | | |
|---|---|---|---|---|---|
| | Type | Calcination | $D_{2.5}$ | $D_{50}$ | $D_{95}$ |
| 17 | A | not conducted | 80 | 170 | 260 |
| 18 | B | not conducted | 180 | 470 | 1200 |
| 19 | E | 1000° C. | 1990 | 5300 | ≥10000 |
| 20 | E | 1200° C. | 2490 | 6310 | ≥10000 |

Next, each of the raw materials as above was admixed with 0.5 wt % of one kind of $ZrO_2$ powder (Powder No. A, of normal dry type) produced by Daiichi Kigenso Kagaku Kogyo Co., Ltd. The particle size distribution of the $ZrO_2$ powder added here was as shown in Table 2 above.

Subsequently, each of all the 2 wt % $Yb_2O_3$-added $Sc_2O_3$ mixed powder raw materials thus obtained was placed in a mold having a diameter of 10 mm, and tentatively molded into a 20 mm-long rod-like shape by use of a uniaxial press molding machine, followed by pressing at a hydrostatic pressure of 198 MPa, to obtain a CIP molded body. The CIP molded bodies thus obtained were placed in a muffle furnace, and degreased by a heat treatment at 800° C. in air for three hours.

Next, each of the degreased molded bodies thus obtained was placed in a vacuum heating furnace, and the temperature was raised to a value of 1600 to 1700° C. at a rate of 100° C./h. After held at the raised temperature for three hours, each of the sample bodies was cooled at a rate of 600° C./h, to obtain a sintered body. In this case, the sintering temperature and holding time were so controlled that the relative densities of the samples upon sintering were substantially the same value of 95%. In addition, the sintering start temperatures for the respective samples were recorded.

Each of the sintered bodies thus obtained was cut into two pieces, the cut surface was subjected to optical polishing, and each piece was subjected to a thermal etching treatment at 1550° C. for two hours. The samples thus obtained were evaluated as to the sintered particle diameter and the size of gas voids (pores) present in the optically polished surface by SEM observation (the sintered particle diameter was observed on a reflected electron image, while the void size was observed on a secondary electron image). The results are set forth in Table 12 below.

TABLE 12

| Powder No. | $Yb_2O_3$-added $Sc_2O_3$ raw material powder | | $ZrO_2$ raw material powder | Sintering start temperature (° C.) | Average sintered particle diameter (μm) | Gas voids Size (μm) |
|---|---|---|---|---|---|---|
| | Type | Calcination | Type | | | |
| 17A | A | not conducted | normal | Ts − 200 | 2.0 | 50 |
| 18A | B | not conducted | normal | Ts | 1.5-2.0 | 2 |

TABLE 12-continued

| Powder No. | $Yb_2O_3$-added $Sc_2O_3$ raw material powder | | $ZrO_2$ raw material powder Type | Sintering start temperature (°C.) | Average sintered particle diameter (μm) | Gas voids Size (μm) |
|---|---|---|---|---|---|---|
| | Type | Calcination | | | | |
| 19A | E | 1000° C. | normal | Ts + 150 | 5.0-5.5 | 2.5 |
| 20A | E | 1200° C. | normal | Ts + 200 | 6.0-6.5 | 5 |

Ts: typical temperature

Subsequently, of the sintered bodies as above-mentioned, those samples not having been bisected were subjected to an HIP treatment at a temperature of 1600 to 1700° C. and a pressure of 98 to 198 MPa for three hours by use of Ar gas as a pressurization medium. The HIP-treated samples thus obtained were put to observation of external appearance, and were each ground and polished so as to be 14 mm in length. Both optical end faces of each of the thus obtained samples were subjected to final optical polishing with an optical surface accuracy of $\lambda/8$ (measurement wavelength $\lambda=633$ nm), and, further, were coated with an antireflective film, after which transmittance at an antireflective film design center wavelength of 600 nm was measured and evaluated. The results are shown in Table 13 below.

TABLE 13

| Powder No. | $Yb_2O_3$-added $Sc_2O_3$ raw material powder | | $ZrO_2$ raw material powder Type | External appearance | Visible-region transmittance (length 14 mm) | Reduced visible-region transmission loss |
|---|---|---|---|---|---|---|
| | Type | Calcination | | | | |
| 17A | A | not conducted | normal | cloudy, opaque | less than 5% | unmeasurable |
| 18A | B | not conducted | normal | transparent | 95.5% | 0.3%/mm |
| 19A | E | 1000° C. | normal | transparent | 94% | 0.4%/mm |
| 20A | E | 1200° C. | normal | cloudy, opaque | less than 5% | unmeasurable |

From these results it is seen that when the particle diameter $D_{2.5}$ value at which the cumulative particle amount from the minimum particle size side is 2.5% based on the total particle amount in the particle size distribution of the 2 wt % $Yb_2O_3$-added $Sc_2O_3$ powder used as the starting material is at least 180 nm, the growth of gas voids after vacuum sintering is suppressed to up to 2 μm. It was also confirmed that when an HIP treatment is further conducted, it is possible to obtain an $M_2O_3$ type sesquioxide sintered body which is truly transparent as represented by a transmittance of at least 94% (a reduced loss of up to 0.4%/mm) for a 14 mm-long rod-shaped sample provided with an antireflective film (Powder Nos. 18A to 19A). In addition, when the particle diameter $D_{2.5}$ value at which the cumulative particle amount from the minimum particle size side is 2.5% based on the total particle amount in the particle size distribution of the 2 wt % $Yb_2O_3$-added $Sc_2O_3$ powder used as the starting material is increased to 2490 nm as the particles are coarsened (Powder No. 20A), only a sintered body which is cloudy and opaque to the naked eye could be obtained. Furthermore, an analysis of the SEM image of this sample revealed that the sintered particle diameter was little different from the starting material particle diameter $D_{50}$ value; in other words, particle growth did not take place during the sintering step, and, moreover, innumerable pores (gas voids) were observed in the grain boundaries. Also, a rise in the sintering start temperature was confirmed. Thus, it is considered that if the starting material is too coarse, sinterability would be poor and an increase in denseness would progress with difficulty.

Thus, for the 2 wt % $Yb_2O_3$-added $Sc_2O_3$ sesquioxide sintered body in this test example, also, the same tendency as those of the $Y_2O_3$ sesquioxide sintered body and the $Lu_2O_3$ sesquioxide sintered body in the above-described Test Examples 1 and 2 was confirmed to exist in obtaining a transparent sintered body. Furthermore, while the $Yb_2O_3$ powder was selected as an example of addition of a tiny amount of a lanthanide element, it was confirmed that the tendency in obtaining a transparent sintered body in the case of adding a tiny amount (2 wt %) of the element was also the same as those observed with the $Y_2O_3$ sesquioxide sintered body and the $Lu_2O_3$ sesquioxide sintered body which were prepared without such addition. Incidentally, the $Y_2O_3$ sesquioxide sintered body and the $Lu_2O_3$ sesquioxide sintered body are often used as host matrix for various kinds of functional transparent $M_2O_3$ type sesquioxide sintered bodies which can be obtained through addition of tiny amounts of various lanthanide elements. In the test examples here, the results obtained in the cases where tiny amounts of various lanthanide elements are further added to the $Y_2O_3$ sesquioxide sintered bodies and $Lu_2O_3$ sesquioxide sintered bodies are not specifically described. However, various ones of the lanthanide elements resemble in behaviors concerning sintering; therefore, the method of manufacturing a transparent $M_2O_3$ type sesquioxide sintered body made clear in the present invention is basically applicable also to those various kinds of functional transparent $M_2O_3$ type sesquioxide sintered bodies which are obtained through addition of tiny amounts of various lanthanide elements to $Y_2O_3$ sesquioxide sintered bodies or $Lu_2O_3$ sesquioxide sintered bodies.

Test Example 4

An example in which a $Tb_4O_7$ powder and a $Y_2O_3$ powder were mixed and the mixture was sintered will be described.

Here, five kinds of $Y_2O_3$ powders differing in particle size distribution and five kinds of $Tb_4O_7$ powders different in particle size distribution, produced by Shin-Etsu Chemical Co., Ltd., were obtained. All the powders had a purity of at least 99.9 wt %. Subsequently, a total of five kinds of combinations of $Y_2O_3$ powder and $Tb_4O_7$ powder of the same kind ($Y_2O_3$ and $Tb_4O$, powders with particle size distributions on the same level) were respectively blended in a volume ratio of 1:1 in wet condition, followed by drying, to prepare mixed $M_2O_3$ type sesquioxide powders. Furthermore, parts of the mixed powder of Type A were calcined in air at 1000° C. and 1200° C. for three hours, while part of the mixed powder of Type B was calcined in air at 1000° C. for three hours, to prepare respective powders having been coarsened in effective particle size through necking. Each of all the powdery raw materials thus prepared was dispersed in ethanol, and subjected to measurement of particle size distribution by use of particle size analyzers (Microtrac MT3000II and Nanotrac UPA, produced by Nikkiso Co., Ltd.). Of the measurement results obtained for each of the powder materials, the particle diameter $D_{2.5}$ value at which the cumulative particle amount from the minimum particle size side is 2.5% based on the total particle amount in the particle size distribution is shown in Table 14 below, together with $D_{50}$ value and $D_{95}$ value.

TABLE 14

| Powder No. | $Y_2O_3$—$Tb_4O_7$ mixed raw material powder | | Particle diameter (nm) | | |
|---|---|---|---|---|---|
| | Type | Calcination | $D_{2.5}$ | $D_{50}$ | $D_{95}$ |
| 21 | A | not conducted | 85 | 175 | 290 |
| 22 | A | 1000° C. | 120 | 550 | 1050 |
| 23 | A | 1200° C. | 150 | 560 | 1230 |
| 24 | B | not conducted | 180 | 470 | 1210 |
| 25 | B | 1000° C. | 220 | 900 | 1670 |
| 26 | C | not conducted | 240 | 950 | 1980 |
| 27 | D | not conducted | 560 | 1000 | 1750 |
| 28 | E | not conducted | 1240 | 3240 | 7320 |

Next, each of the raw materials as above was admixed with 0.5 wt % of one kind of $ZrO_2$ powder (Powder No. A, of normal dry type) produced by Daiichi Kigenso Kagaku Kogyo Co., Ltd. The particle size distribution of the $ZrO_2$ powder added here was as shown in Table 2 above.

Subsequently, each of all the $Y_2O_3$—$Tb_4O$, mixed powder raw materials was placed in a mold having a diameter of 10 mm, and tentatively molded into a 20 mm-long rod-like shape by use of a uniaxial press molding machine, followed by pressing at a hydrostatic pressure of 198 MPa, to obtain a CIP molded body. Here, the relative density of each of the molded bodies thus obtained was estimated from the diameter and length of the tablet. Subsequently, the CIP molded bodies obtained were placed in a muffle furnace, and degreased by a heat treatment at 800° C. in air for three hours.

Next, each of the degreased molded bodies thus obtained was placed in a vacuum heating furnace, and the temperature was raised to a value of 1600 to 1700° C. at a rate of 100° C./h. After held at the raised temperature for three hours, each of the sample bodies was cooled at a rate of 600° C./h, to obtain a sintered body. Some (Powder Nos. 27A and 28A) of the sintered bodies thus obtained were in a cracked state. The samples obtained without cracking were selected, and were each cut into two pieces. The cut surface of each piece was subjected to optical polishing, and each piece was subjected to a thermal etching treatment at 1500° C. for two hours. The samples thus obtained were evaluated as to the sintered particle diameter and the size of gas voids (pores) present in the optically polished surface by SEM observation (the sintered particle diameter was observed on a reflected electron image, while the void size was observed on a secondary electron image). In addition, the density of each of the CIP molded bodies was determined by a volume-weight method, and the density was divided by the true density of the powder constituting the CIP molded body, to determine the relative density. The results are set forth in Table 15 below.

TABLE 15

| Powder No. | $Y_2O_3$—$Tb_4O_7$ mixed raw material powder | | $ZrO_2$ raw material powder | Relative density | Presence/absence of cracks | Average sintered particle diameter (μm) | Gas voids Size (μm) |
|---|---|---|---|---|---|---|---|
| | Type | Calcination | Type | (%) | | | |
| 21A | A | not conducted | normal | 50 | absent (OK) | 2.0 | 40 |
| 22A | A | 1000° C. | normal | 54 | absent (OK) | 2.0 | 8 |
| 23A | A | 1200° C. | normal | 55 | absent (OK) | 2.0 | 4 |
| 24A | B | not conducted | normal | 49 | absent (OK) | 1.5-2.0 | 2 |
| 25A | B | 1000° C. | normal | 54 | absent (OK) | 1.5-2.0 | 2 |
| 26A | C | not conducted | normal | 58 | absent (OK) | 1.0 | 1 |
| 27A | D | not conducted | normal | 65 | present (NG) | 1.0 | not observed |
| 28A | E | not conducted | normal | 60 | present (NG) | 1.0 | not observed |

Of the sintered bodies above, those samples which had not been cracked and not been bisected were subjected to an HIP treatment for three hours at a temperature of 1600 to 1700° C. and a pressure of 98 to 198 MPa by use of Ar gas as a pressurization medium. The HIP-treated samples thus obtained were put to observation of external appearance, and were each ground and polished so as to be 14 mm in length. Both optical end faces of each of the thus obtained samples were subjected to final optical polishing with an optical surface accuracy of λ/8 (measurement wavelength λ=633 nm), and, further, were coated with an antireflective film, after which transmittance at an antireflective film design center wavelength of 600 m was measured and evaluated. The results are shown in Table 16 below.

TABLE 16

| Powder No. | $Y_2O_3$—$Tb_4O_7$ mixed raw material powder | | $ZrO_2$ raw material powder | External appearance | Visible-region transmittance (length 14 mm) | Reduced visible-region transmission loss |
| --- | --- | --- | --- | --- | --- | --- |
| | Type | Calcination | Type | | | |
| 21A | A | not conducted | normal | devitrified | less than 5% | unmeasurable |
| 22A | A | 1000° C. | normal | devitrified | less than 5% | unmeasurable |
| 23A | A | 1200° C. | normal | translucent | 12% | 6.3%/mm |
| 24A | B | not conducted | normal | transparent | 95% | 0.35%/mm |
| 25A | B | 1000° C. | normal | transparent | 97% | 0.2%/mm |
| 26A | C | not conducted | normal | transparent | 96% | 0.3%/mm |

From these results it is seen that when the particle diameter $D_{2.5}$ value at which the cumulative particle amount from the minimum particle size side is 2.5% based on the total particle amount in the particle size distribution of the $Y_2O_3$—$Tb_4O_7$ mixed powder used as the starting material is at least 180 nm, the growth of gas voids after vacuum sintering is suppressed to up to 2 μm. Like in Test Examples 1, 2 and 3, it was also confirmed that when an HIP treatment is further conducted, it is possible to obtain an $M_2O_3$ type sesquioxide sintered body which is truly transparent as represented by a transmittance of at least 95% (a reduced loss of up to 0.35%/mm) for a 14 mm-long rod-shaped sample provided with an antireflective film (Powder Nos. 24A to 26A). It is to be noted here, however, that a fact as follows was newly confirmed. In regard of the raw materials obtained through mixing of the $Tb_4O_7$ powder, it was found that when the particle diameter $D_{2.5}$ value at which the cumulative particle amount from the minimum particle size side is 2.5% based on the total particle amount in the particle size distribution is above 240 nm, specifically at least 560 nm, and/or when the $D_{2.5}$ value (corresponding to the median diameter) is above 950 nm, moldability of the powder material would be excessively high, and the relative density after CIP molding would be at least 59%, resulting in cracking (NG) during the sintering step (Powder Nos. 27A and 28A).

The reason why the raw material prepared through mixing of the $Tb_4O_7$ powder is cracked during sintering is presumed to reside in the following mechanism. It has been known that the $Tb_4O_7$ powder (actually, $Tb_{11}O_{20}$ powder) undergoes reversible phase change of $Tb_4O_7$ ($Tb_{11}O_{20}$)→$Tb_7O_{12}$→$Tb_2O_3$ while releasing oxygen gas in the course of a rise in temperature. It is considered here that if the $Tb_4O_7$ powder-containing molded body is molded with too high a density, in the oxygen gas releasing process during the temperature rise, it becomes impossible for open pores with sufficient density and size for communication between the inside and the outside of the molded body to exist. As a result, probably, the oxygen gas generated inside the molded body cannot be adequately discharged to the outside of the molded body. This is considered to result in that an expansive internal pressure is exerted on the inside of the molded body, and, when the internal pressure reaches or exceeds a certain magnitude, rupture or breakage of the molded body is brought about. Accordingly, in order to obtain a transparent $M_2O_3$ type sesquioxide sintered body containing a $Tb_4O_7$ raw material, the relative density at the time of molding should be suppressed to up to 58%. This requirement can be fulfilled by strict control of the particle size of the starting material. Specifically, as seen from the above-obtained results, this requirement can be met by such a control that the particle diameter $D_{2.5}$ value at which the cumulative particle amount from the minimum particle size side is 2.5% based on the total particle amount in the particle size distribution of the starting material is up to 240 nm, and the $D_{50}$ value (corresponding to the median diameter) is up to 950 nm.

Incidentally, in connection with the raw material powders varying in particle size which could be obtained this time, those powders wherein the particle diameter $D_{2.5}$ value at which the cumulative particle amount from the minimum particle size side is 2.5% based on the total particle amount in the particle size distribution is in the range from 240 nm to 560 nm were not obtainable. It is to be noted here, however, that these two sizes differ greatly from each other, and the one (560 nm) of the values is at least two times the other (240 nm). It is not conceivable that even a slight excess of the $D_{2.5}$ value over 240 nm might immediately cause an abrupt increase in the relative density upon molding, leading to cracking at the time of sintering of the molded body. Taking the scattering of particle sizes of powders and measuring accuracies of apparatuses into account, the critical value of 240 nm for the $D_{2.5}$ value may probably have an allowance of at least about 10 to 20%. Thus, in order to obtain a transparent $M_2O_3$ type sesquioxide sintered body containing a $Tb_4O_7$ raw material, the particle diameter $D_{2.5}$ value at which the cumulative particle amount from the minimum particle size side is 2.5% based on the total particle amount in the particle size distribution is considered to have an allowable range of up to about 280 nm.

The above-described test examples have made clear the adequate ranges of the minimum value and/or median diameter in the particle size distribution of the starting material for manufacture of a transparent $M_2O_3$ type sesquioxide sintered body (where M is at least one element selected from the group consisting of Y, Sc and lanthanide elements).

Japanese Patent Application No. 2012-221081 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of manufacturing a transparent sesquioxide sintered body comprising:
press molding a raw material powder into a predetermined shape, the raw material powder which is press molded being a powder mixture of (i) particles of an oxide of at least one rare earth element selected from the group consisting of Y, Sc and lanthanide elements and having a particle size distribution of the rare earth element oxide particles, or a particle size distribution of secondary particles in a case where the rare earth element oxide particles are aggregated to form the secondary particles, in which the particle diameter $D_{2.5}$ value at which the cumulative particle amount from the minimum particle size side is 2.5%, based on the total particle amount, is in a range from 180 nm to 2000 nm inclusive, and (ii) Zr oxide particles;
and thereafter sintering the press molded body to manufacture a transparent $M_2O_3$ type sesquioxide sintered body where M is at least one rare earth element selected from the group consisting of Y, Sc and lanthanide elements.

2. The method of manufacturing a transparent sesquioxide sintered body according to claim 1, wherein the rare earth element is selected from the group consisting of Y, Sc, Lu, Tb, Yb, Gd, Nd, Eu, Ho, Dy, Tm, Sm, Pr, Ce and Er.

3. The method of manufacturing a transparent sesquioxide sintered body according to claim 1, wherein the raw material powder is a powder mixture of (i) rare earth element oxides particles in which Tb oxide particles and particles of an oxide of at least one rare earth element selected from the group consisting of Y, Sc and lanthanide elements other than Tb are mixed, and (ii) Zr oxide particles, and, the particle size distribution of (i) the rare earth element oxides particles of the raw material powder, or the particle size distribution of secondary particles in a case where the rare earth element oxides particles are aggregated to form the secondary particles, has a $D_{2.5}$ value in a range from 180 nm to 280 nm, inclusive, and a $D_{50}$ value or a median diameter of up to 950 nm.

4. The method of manufacturing a transparent sesquioxide sintered body according to claim 1, wherein the amount of the Zr oxide particles is up to 1% by weight in the raw material powder.

5. The method of manufacturing a transparent sesquioxide sintered body according to claim 1, wherein a hot isostatic press (HIP) treatment is conducted after the sintering.

6. A transparent sesquioxide sintered body manufactured by the method of manufacturing a transparent sesquioxide sintered body according to claim 1.

* * * * *